United States Patent
Paul

[11] 3,731,402
[45] May 8, 1973

[54] EDUCATIONAL DEVICE

[76] Inventor: Gertrude M. Paul, 98 Lakeview Lane, Chagrin Falls, Ohio 44022

[22] Filed: Mar. 8, 1971

[21] Appl. No.: 121,816

[52] U.S. Cl. ..................35/37
[51] Int. Cl. ..................G09b 11/04
[58] Field of Search..............35/36, 37, 38, 73

[56] References Cited

UNITED STATES PATENTS

| | | | |
|---|---|---|---|
| 1,857,009 | 5/1932 | Amor | 35/73 |
| 3,149,426 | 9/1964 | Kaeyer | 35/37 X |

FOREIGN PATENTS OR APPLICATIONS

| | | | |
|---|---|---|---|
| 629,856 | 5/1936 | Germany | 35/37 |
| 670,476 | 9/1963 | Canada | 35/37 |
| 75,654 | 2/1919 | Austria | 35/38 |

*Primary Examiner*—Wm. H. Grieb
*Attorney*—John Mahoney

[57] ABSTRACT

An educational device including a base plate, a front frame having its left edge secured to the left edge of the base plate and a roll having paper thereon secured to the upper end of the base plate which roll is provided with a knob which a pupil may rotate with one hand while he pulls the free end of the paper downwardly between the base plate and the frame. The front frame is provided with an elongated opening for receiving a slide having letters or numerals stencilled therein. The slide maybe formed of a single piece or a plurality of connected segments which slide is held stationary within the frame by suitable means, such as by bevelled edges which engage bevelled edges at the openings in the front frame. The stencil is preferably formed of a plastic material having a thickness of 0.05 to 0.06 of an inch so that in forming letters or numerals, the pencil will follow a definite pattern. If desired, small numerals may be etched or printed upon the stencil adjacent each letter or numeral to show the progressive strokes of the pencil which are utilized in forming the letters or numerals.

12 Claims, 13 Drawing Figures

PATENTED MAY 8 1973 3,731,402

INVENTOR.
GERTRUDE M. PAUL
BY
John Mahoney
ATTORNEY

INVENTOR.
GERTRUDE M. PAUL
BY
John Mahoney
ATTORNEY

EDUCATIONAL DEVICE

The present invention relates to an educational device and more particularly to a device for teaching retarded children to write the letters of the alphabet and simple words suggested by the sound of particular letters. It also relates to a device including a front frame having a stencil slidable in the frame and having openings shaped in the form of letters or numerals in which small numerals are arranged upon the stencil to designate the progressive strokes of a pencil required to form the numerals or letters on a sheet of paper arranged between the frame and a base plate.

In accordance with my invention, a device is provided including a base plate, means whereby a sheet of paper may be passed by the pupil over the base plate, and a front frame having one edge secured to the base plate and its opposite edge free so that the sheet of paper may be easily passed between the base plate and the front frame. In my invention, the front frame is provided with one or more openings shaped to form a guide for one or more slides having letters stencilled therein in such a manner that the pupil may easily follow the stencil to correctly write the letters upon the sheet of paper and after one row of letters is written upon the paper, the pupil may by simply turning a knob with one hand rotate a roll of paper associated with the upper portion of the base plate and pull the paper downwardly with his other hand upon the base sheet and the writing of letters through the stencil in the front frame may be repeated as often as necessary to familiarize the pupil with them. If desired, however, the front frame may be provided with more than one slide in which case a lower slide may also be provided with a stencil having openings through which one or more letters and preferably a word is formed which the pupil will readily understand is associated with one or more of the letters stencilled in the upper slide, such as the word "baby". In accordance with my invention, the stencil is made in such a manner that the pupil in following the openings in the stencil will correctly write the letters or word.

My invention will be better understood by reference to the accompanying drawings in which.

Figure 1:
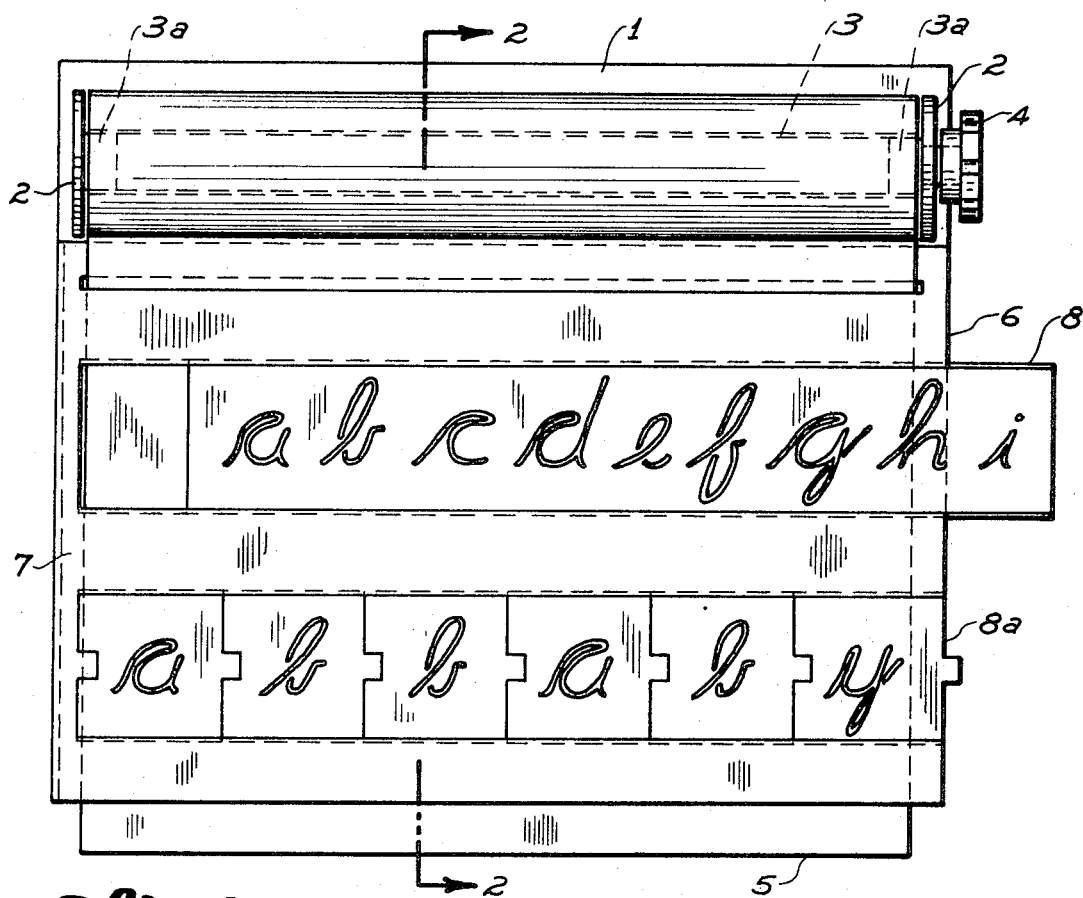
FIG. 1 is a plan view of my improved device.
Figure 3:
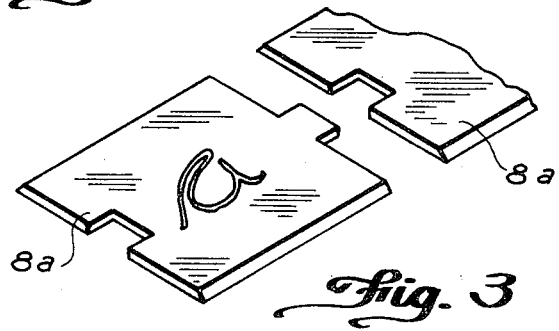
FIG. 3 is a perspective view of parts of a slide, each having a letter or numeral stencilled thereon.

My improved device as shown in FIG. 1 of the drawing consists of a base plate 1 at the upper portion of which a roll of paper is supported by suitable means, such as brackets 2, and a core 3 which core is frictionally engaged by an annular protuberance 3a at each end, one of which is connected to a knob 4 so that upon turning the knob connected to one of the turbulences 3a with one hand and exerting a pull upon the paper with the other hand, the paper which is designated by the numeral 5 may be pulled downwardly over the base plate.

Figure 2:
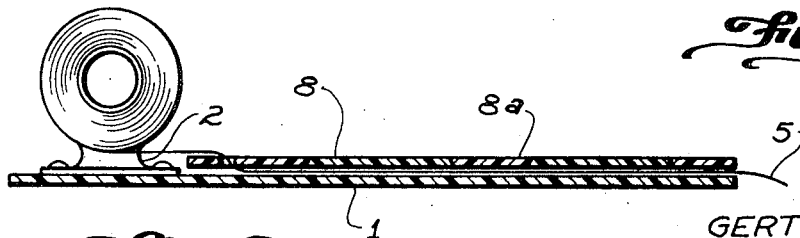
FIG. 2 is a cross sectional view taken on a plane passing through the line 2—2 of FIG. 1.

As shown more particularly in FIGS. 1 and 2 of the drawings, a front cover plate or frame 6 is also provided which is connected to the left edge of the base plate in any desired manner, and while I do not desire to limit myself to any particular material of which my improved device is formed, as shown in FIG. 2, the base sheet and the front frame are preferably formed of a plastic material. For instance, the base plate may be formed of polyethylene which is resilient in which case the left edge of the base plate may be bent over the left hand edge of the front frame to hold it in place as indicated by the numeral 7. In such case because of the resiliency of the base plate, it will hold the left edge of the front frame in place. The right edge of the front frame, however, may be raised to permit the paper to be passed between the base plate and the front frame. In my improved device, however, the rear plate and the front frame may be formed of a transparent acrylic plastic material which may be worked to form threaded openings therein, such as Lucite or Plexiglass which may be connected together with hinges having their flanges engaging the upper frame and the lower base plate and being provided rearly thereof with respective upwardly and downwardly extending aligned flanges terminating in interfitting ring-shaped openings therein through which a pintle may extend. When the stencil is formed of a transparent plastic material, it may have a thickness of approximately 0.05 to 0.06 of an inch so that the pupil may by following the opening in the stencil correctly write letters or numerals upon the paper beneath the front frame.

In practicing my invention, the front plate is provided with one or more openings therein to provide a track or tracks in which a stencil 8 or stencils 8 and 8a may be inserted and held in place. Although interfitting parts of any desired type may be used to hold the stencil in place in the frame, such as ribs on the slide which extends into grooves on the edges of the opening in the front plate, as shown more particularly in the drawing, the edges or the opening or openings in the front plate are bevelled downwardly in opposite directions to hold the stencil in place. As shown in FIG. 1, the stencil has nine small cursive letters formed therein. It will be understood, however, that this is merely illustrative because the letters may be spaced further apart and less than eight letters may be formed upon a single slide. For instance, for beginners, the slide may be provided with only four letters stencilled therein and although the slide is preferably formed of a plastic material, it will be understood that it may be formed of other material, such as metal.

Figure 4:
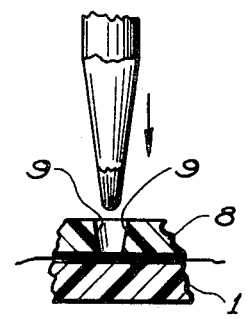
FIG. 4 is a detail view showing the bevelled sides of an opening in the stencil with the point of the pencil arranged to engage the paper beneath the opening and the sharpened wood of the pencil arranged to engage the wall of the stencil leading to the opening.

In my improved slides, it will be understood that the letters or numerals are cut into the slide in such a manner that the pencil follows the track smoothly. As shown in FIG. 4, the faces of the grooves cut in the stencil are bevelled as indicated by the numerals 9 with the point of the pencil engaging the paper and as shown, the track is proportioned to insure proper holding of the pencil to permit tracing of the letter on the sheet of paper beneath the front plate. In other words, the track is wider on the surface of the stencil than it is at the inner opening and while the lead of the pencil fits into the inner opening in the stencil, the part of the pencil above the exposed lead fits into the upper part of the track, and the letters of the alphabet or the numerals of a font are fashioned in such a manner that the pupil will not make an improper stroke. In other words, the pupil must follow the outline in writing the letters or numerals and cannot make any stroke in a random manner. As shown, the lead of the pencil must extend through the bottom portion of the cut in the stencil and the bevelled portion of the wooden part of the sharpened pencil may be inclined to border the upper part of the cut-out in the stencil. By providing such an arrangement, it will be apparent that the pencil will follow the groove and pass into the oval parts of letters, such as $a, b, d, e, f, g, h, j, k, l, o, p, q, s, y$ and $z$. This is one of the principal reasons why stencils as heretofore provided cannot be used as a teaching device for retarded children.

Although as shown in FIG. 1, the upper slide contains nine letters, for beginners, a slide may be provided that has a less number of letters, such as four, and as the pupil turns the knob and pulls the sheet of paper downwardly the letters may be rewritten a comparatively large number of times to thoroughly familiarize the pupil with them.

Instead of stencilling letters or numerals in an integral slide as shown in the upper part of the front frame in FIG. 1, the slide may be formed of a plurality of segments connected together as shown in the bottom slide $8a$ in the front plate. In each of the stencils a plurality of the same letter or different letters may be stencilled in the same segment, or if desired, two slides may be provided in a single frame and a word stencilled in the lower slide which may be suggested by certain letters stencilled in the upper slide. To connect the letters in the lower slide together, the letters may each be provided with a projection that fits snugly into an opening of the next adjacent letter forming part of the slide.

As previously stated, it will of course be understood that each of the openings in the front frame has a downwardly inclined edge on each side and each of the slides and each of the slidable segments in the front frame has downwardly inclined edges so that the slide and segments may be held in place. When the front plate or frame has two openings to receive the two slides, preferably the lower slide contains a word which may be developed by the combined sound of several of the letters, such as the word "baby" which is suggested by the combination of the letters "$b$" and "$a$" to which the letter "$y$" may be added.

Figure 5:
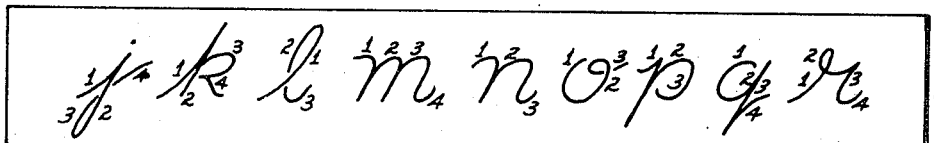
FIGS. 5 to 13, inclusive, disclose additional slides, one or more of which may be utilized in the front frame.
Figure 6:
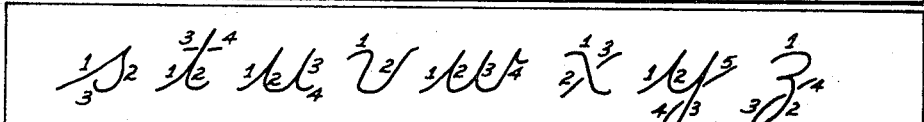

Slides having the letters shown in FIGS. 5 and 6, respectively, may also be stencilled in separate slides and may be used in my improved device to teach these particular letters of the alphabet. Instead of stencilling all of the letters shown in FIG. 5 or all of the letters shown in FIG. 6 on a single slide, however, it will of course be understood that three or four of them may be formed on a single slide and an additional small group may be stencilled on additional slides and this is particularly true when the pupils are beginners. In stencilling the letters shown in FIGS. 5 and 6, it will be understood that the sides of each of the stencilled letters will follow the loops and will not pass into the interior of such loops, such as the letters $j, k, l, o, p,$ and $q$ in FIG. 5 and the letters $a, y$ and $z$ in FIG. 6.

Figure 7:
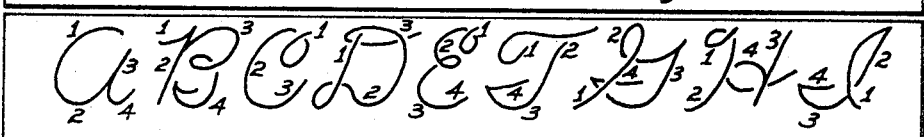
Figure 8:
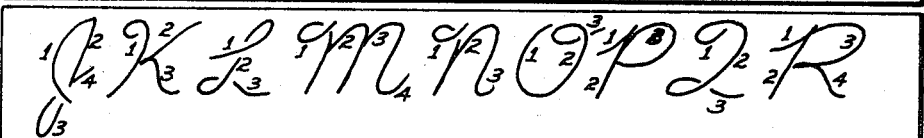
Figure 9:
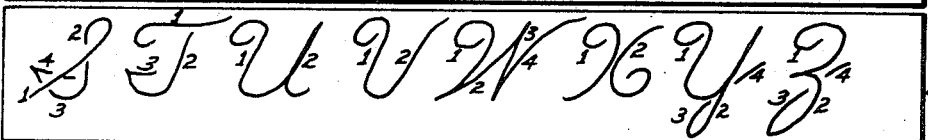
Figure 10:
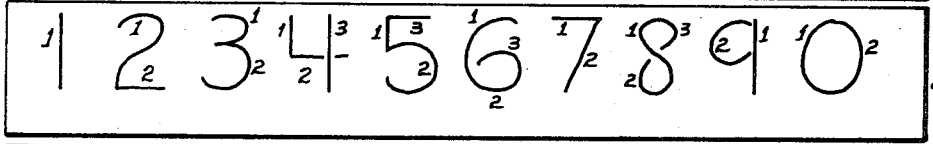

The cursive capital letters as shown in FIGS. 7, 8 and 9 may also be stencilled and used in the slides of the front frame and while for purposes of illustration, the capital letters have been arranged in three groups, it will be understood that if desired a smaller number, such as three or four, may be stencilled in each slide. To enable the pupil to follow in sequence the particular movement of the pencil in forming the capital letters, small numbers may be formed, such as by printing or etching, on the parts of the stencil to indicate the sequence of the strokes of the pupil in making them.

Slides may also be provided in which a font of numbers are stencilled in the slide in which case small numbers may be formed as by printing or otherwise on the stencil showing the progressive strokes of the pencil in making the numbers on the sheet of paper.

Figure 11:
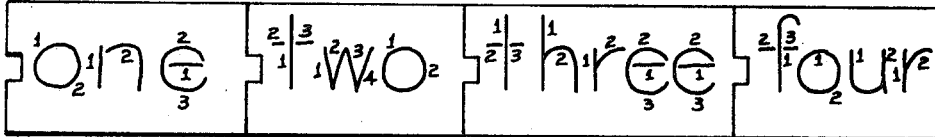

When a slide is introduced into an opening in the upper portion of the frame containing numbers and the sequence of the strokes by the pencil are formed thereon, a frame having numbers written out as shown in FIG. 11 may be used in the opening in the lower portion of the frame with small numbers printed or otherwise formed on the segments showing the sequence of the strokes of the pencil. In such case, the segments are connected together, such as by tongues on the segments, each of which is snugly received in an opening in the next adjacent segment.

Figure 12:
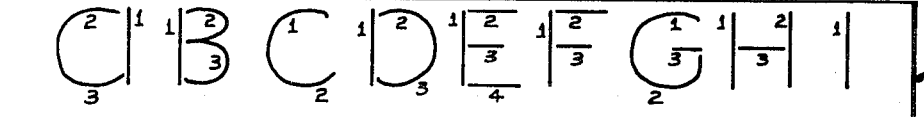
Figure 13:
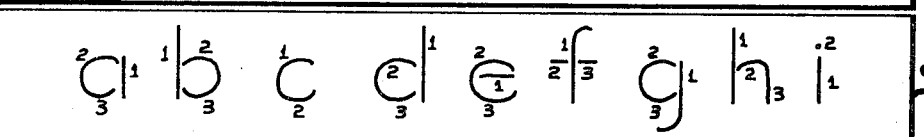

Manuscript capital and small letters may also be stencilled in slides as suggested by those shown in FIGS. 12 and 13, respectively, it being understood that if desired, less than the full complement of letters may be stencilled on each slide. Small numbers may also be formed on the stencil by suitable means, such as etching or printing, to indicate the sequence of strokes of the pencil used in forming the letters on the paper beneath the front plate.

What is claimed is:

1. An educational device including a base plate, a front frame having one of its side edges secured to an edge of the base plate and extending over the base plate and terminating in a free opposite edge, said frame being provided with a longitudinal opening therein, means whereby a sheet of paper may be intermittently passed between the base plate and said frame, and a stencil slidably mounted in the longitudinal opening in said frame which stencil has openings of a type selected from a font of letters and numbers through which openings letter or numbers may be formed on said paper.

2. An educational device as defined in claim 1 including means for supporting the paper in the form of a roll on the base plate, means whereby the paper may be intermittently drawn from the roll so that its free edge may be passed between the base plate and the frame to receive letters or numerals written thereon by a pencil moved through the openings in said stencil.

3. An educational device as defined in claim 1 in which the edges of the opening in said frame and the edges of said stencil have engaging parts arranged in such relation to each other that the stencil is held in a stationary position within the frame and said paper being arranged on a roll on the upper portion of the base plate and having a free end portion which is intermittently movable downwardly between said frame and said base plate so that the same rows of letters or numerals in said stencil may be repeated written upon said paper.

4. An educational device as defined in claim 1 in which the frame has a second longitudinal opening therein below the first longitudinal opening beneath which the paper that has been passed below the first stencil may also be passed, a second stencil arranged within the second longitudinal opening which second stencil consists of segments in each of which a letter is formed, which segments in the second stencil are connected together to form an assembly in which some of the letters in the second stencil are the same as some of the letter in the stencil in the upper longitudinal opening which segments in the second longitudinal opening are so arranged that some of the stencilled letters in adjacent segments therein spell a simple word that is suggested by letters formed in the upper stencil.

5. An educational device as defined in claim 1 in which each of the letters or numerals in the stencil is provided with narrow openings at their inner surface and corresponding in shape to a letter or numeral selected from a font of letters and numerals to receive at their inner surface the lead of a sharpened pencil, the point of which pencil engages paper interposed between the base plate and the frame with both side walls of the groove being bevelled outwardly from the narrow opening and said grooves being thick enough to receive the inclined wooden part of the sharpened pencil so that a pupil holding the pencil with its pointed end extending through the narrow opening in the groove at the bottom of the stencil will cause the pencil to follow the groove to make characters on the paper corresponding to the opening in the grooves in the stencil.

6. An educational device as defined in claim 5 in which the stencil consists of segments having parts arranged in interfitting relation with the frame and with each other in which each of said segments has grooves having narrow openings at their inner portion through which a selected letter or number of a font may be formed on paper arranged between and which is intermittently movable between the base plate and the frame.

7. An education device as defined in claim 5 in which the stencil is formed of a plastic material having a thickness of approximately 0.05 to 0.06 of an inch.

8. An educational device as defined in claim 5 in which the openings in said stencil are in the form of one or more cursive letters of the lower case type.

9. An educational device as defined in claim 5 in which the openings in the stencil are in the form of capital letters of the cursive type.

10. An educational device as defined in claim 5 in which each of the openings in the stencil is in the form of a font of one or more numerals.

11. An educational device as defined in claim 5 in which the front frame has a second elongated rectangularly-shaped opening for receiving a stencil comprising a series of segment, each having an opening therein which when traced with a pencil on the paper beneath the segment forms a letter and in which the stencilled letters in the second longitudinal opening spell a word which is formed as a number in the upper stencil.

12. An educational device as defined in claim 5 in which the openings in the stencil are selected from one or more manuscript letters.

* * * * *